United States Patent [19]

Ginley

[11] 4,324,309
[45] Apr. 13, 1982

[54] CONTROL SYSTEM FOR LEGLESS OPERATION OF MOTOR VEHICLES

[76] Inventor: Maynard Ginley, 2404 Paper La., Wilmington, Del. 19810

[21] Appl. No.: 211,334

[22] Filed: Nov. 28, 1980

[51] Int. Cl.³ .............................................. B60K 26/02
[52] U.S. Cl. ..................................... 180/316; 74/481; 74/515 R; 180/320; 180/335
[58] Field of Search ............... 180/316, 320, 334, 335; 74/515 R, 515 E, 481, 482; 3/21

[56] References Cited

U.S. PATENT DOCUMENTS

| | | | |
|---|---|---|---|
| 1,276,423 | 8/1918 | Seppman | 188/176 |
| 1,299,644 | 4/1919 | Whitbeck | 180/316 |
| 1,531,638 | 3/1925 | Zamberletti | 188/167 |
| 1,735,508 | 11/1929 | Seppman | 188/167 |
| 1,809,021 | 6/1931 | Butler | 188/167 |
| 1,853,504 | 4/1932 | Butler | 74/515 |
| 1,882,927 | 10/1932 | Rockwell | 188/176 |
| 1,938,897 | 12/1933 | Frazier | 74/81 |
| 1,980,559 | 11/1934 | Thompson | 296/69 |
| 2,212,083 | 8/1940 | Stephens | 74/515 |
| 2,221,274 | 11/1940 | Taylor | 74/515 |
| 2,224,276 | 12/1940 | Salmen | 74/515 |
| 2,239,155 | 4/1941 | Levich | 200/59 |
| 2,491,012 | 12/1949 | Montrose-Oster | 74/515 |
| 2,777,335 | 1/1957 | Engberg et al. | 74/481 |
| 2,953,036 | 9/1960 | Wendt | 74/484 |
| 3,037,570 | 6/1962 | Olson | 180/6.5 |
| 3,065,647 | 11/1962 | Whitmore | 74/481 |
| 3,103,130 | 9/1963 | Gunter, Sr. | 74/481 |
| 3,438,673 | 4/1969 | Nelson | 296/37.1 |
| 3,472,094 | 10/1969 | Lake et al. | 74/481 |

Primary Examiner—Joseph F. Peters, Jr.
Assistant Examiner—Donn McGiehan
Attorney, Agent, or Firm—Connolly and Hutz

[57] ABSTRACT

A control system for the legless operation of a motor vehicle includes a rod secured to the accelerator and extending toward the driver's seat with a linkage secured to the brake and extending generally along side the rod in such a manner that both the accelerator and brake can be controlled by the same limb of the operator.

25 Claims, 10 Drawing Figures

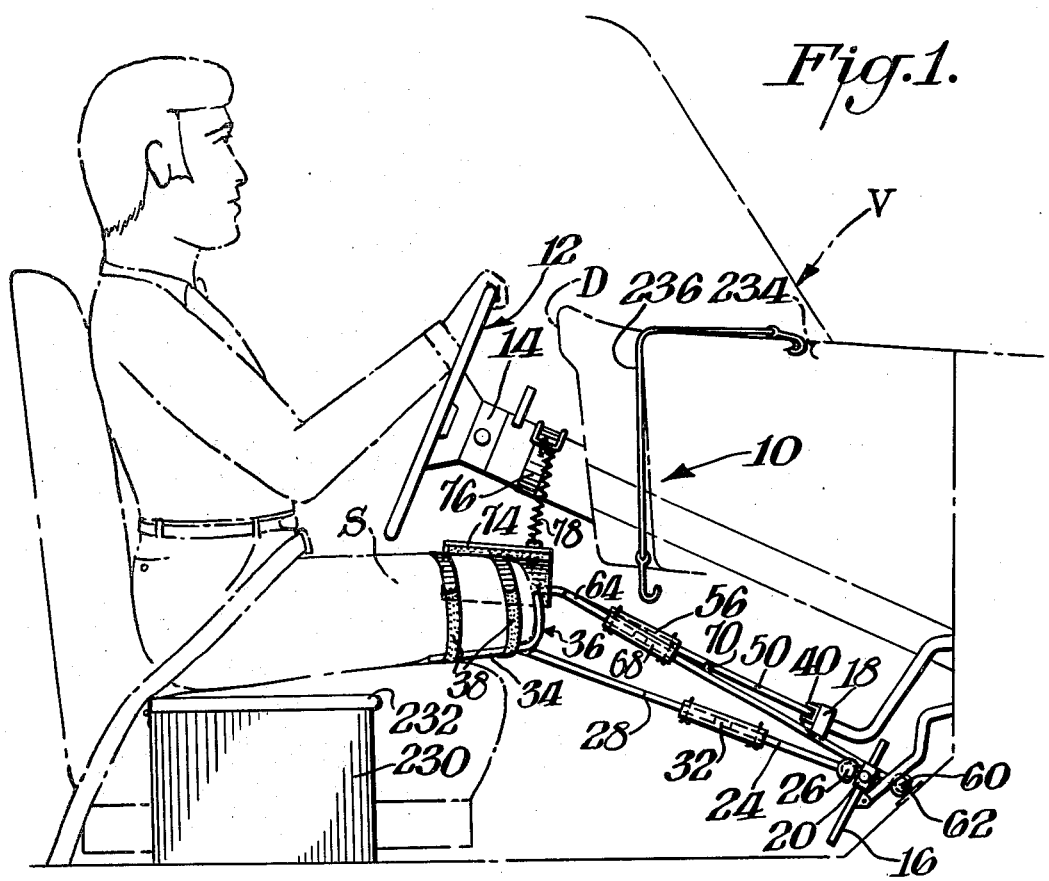
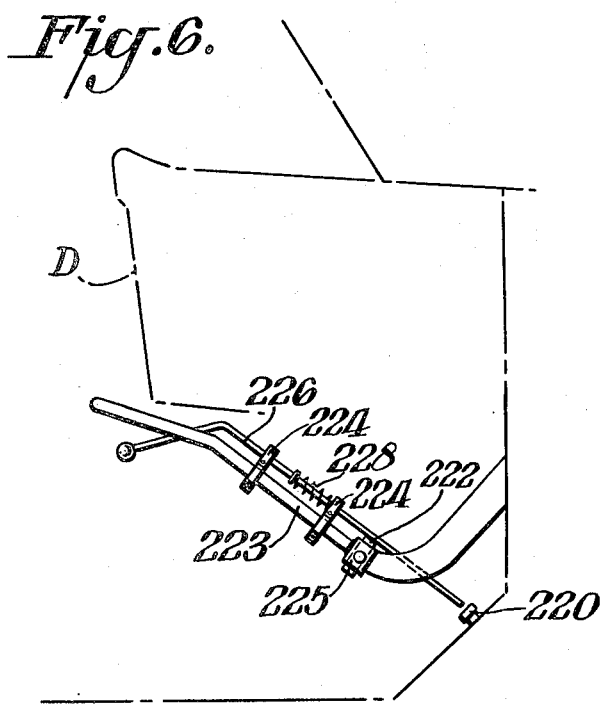
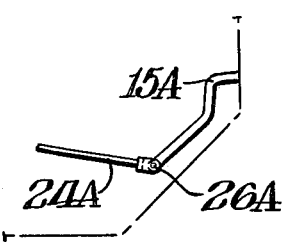

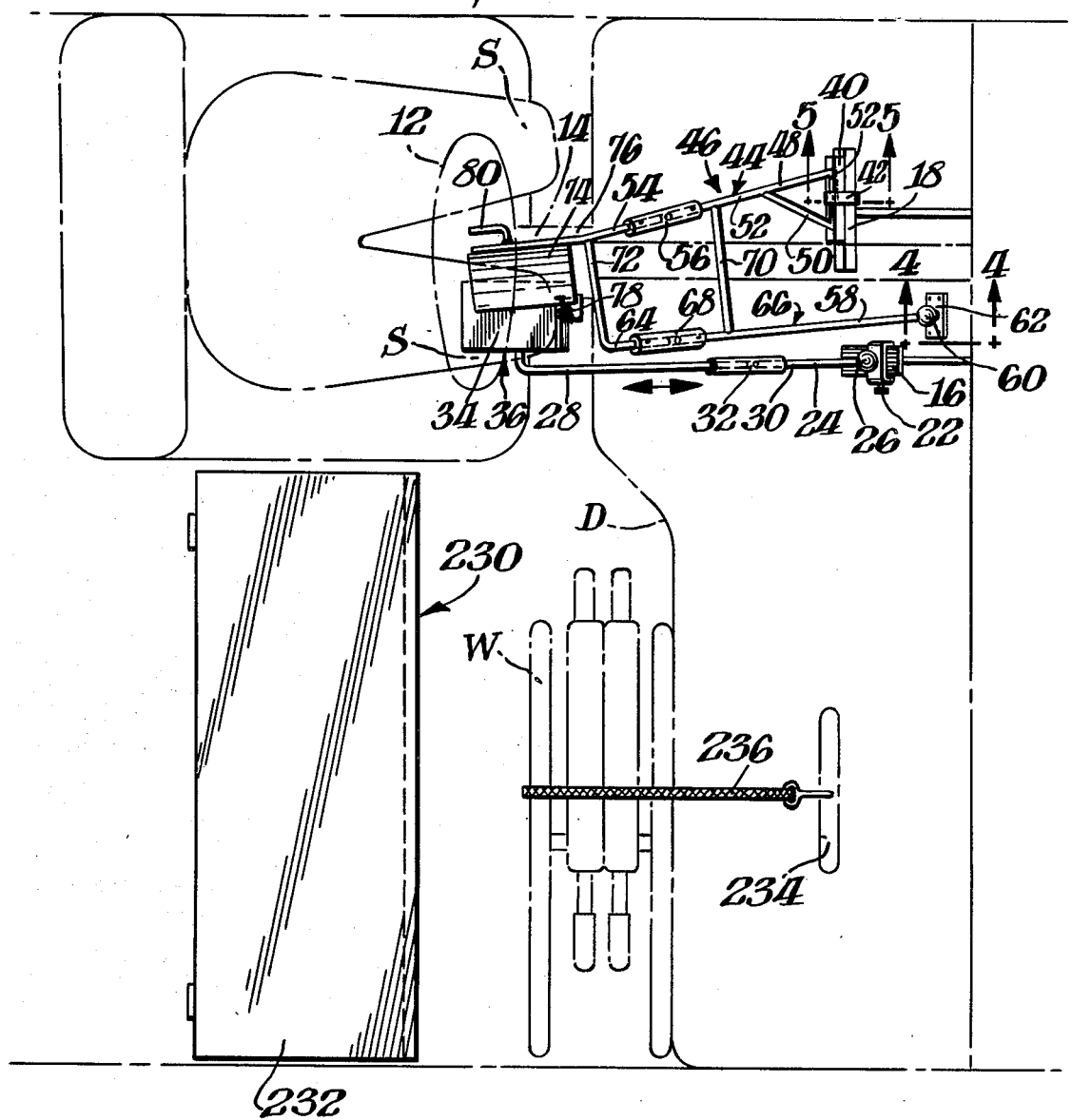

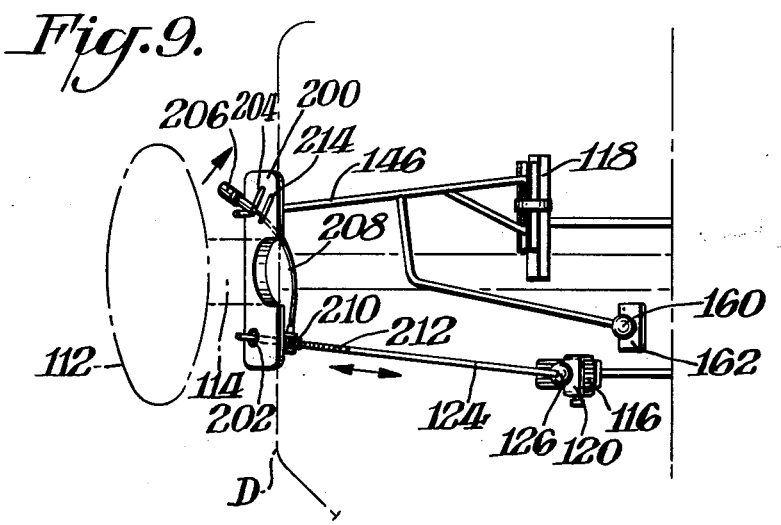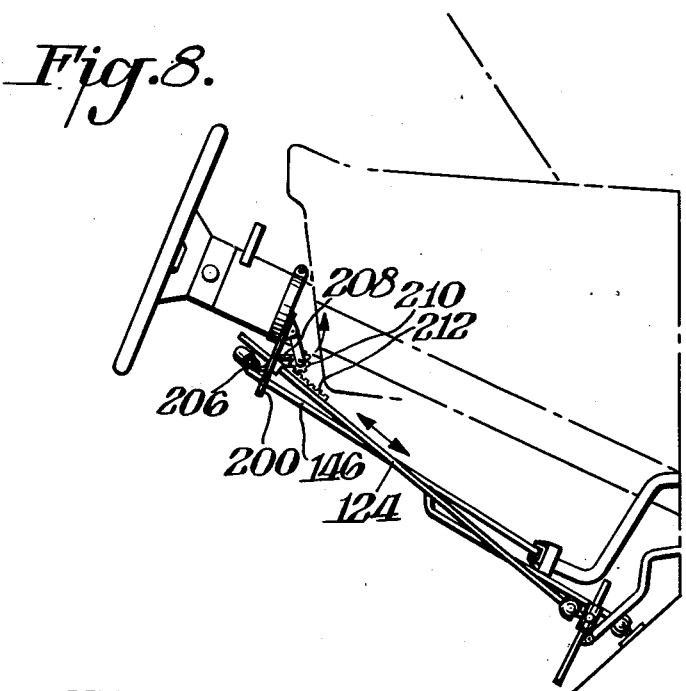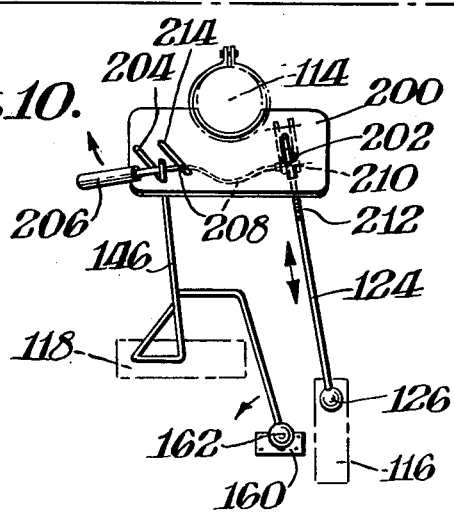

CONTROL SYSTEM FOR LEGLESS OPERATION OF MOTOR VEHICLES

BACKGROUND OF THE INVENTION

There are presently many driver-age persons who cannot drive conventional motor vehicles because such persons have a leg or legs amputated or are otherwise incapable of using their legs. Attempts have been made to provide special controls for such persons. Such attempts, however, are generally confined to hand-operated controls. While such hand-operated controls have a certain degree of usefulness, it would also be desirable if controls could be provided which are not necessarily limited to actuation by the hand but, for example, could also be actuated by a stump of the remaining limb.

SUMMARY OF THE INVENTION

An object of this invention is to provide a control system for motor vehicles which may be conveniently operated by legless drivers.

A further object of this invention is to provide such a system which could be stump operated.

A yet further object of this invention is to provide a modified system which may be hand operated.

A yet further object of this invention is to provide such a system which could be adapted to conventional motor vehicles with only minor modifications.

In accordance with this invention, a control system for motor vehicles includes a rod secured to the accelerator and extending upwardly in the general area of the steering wheel near the operator's seat. A linkage is also secured to the brake and extends upwardly generally along side the rod. Control means is secured to the rod and further control means is secured to the linkage so that the same limb of the operator may be utilized for selectively actuating both the accelerator and the brake.

In one form of this invention the control system is specifically designed to be stump operated. In this embodiment a plate is connected to the end of the rod remote from the accelerator and the stump may be detachably connected to the plate by straps or other suitable means. The linkage is connected to the brake in such a manner that imparting a sidewards or lateral motion to an actuating member at the end of the linkage will cause the brake to be depressed. Thus in operation, the driver can control the accelerator by up and down movement of his stump and can, when required, apply the brake by moving the stump laterally against the brake actuating member.

In an alternative form of this invention the control system is hand operated. In this embodiment a plate is secured to the steering wheel with the accelerator control rod being mounted for up and down movement through the plate and with the brake being mounted for sliding movement in the plate. A control handle may be secured to the linkage and rod in such a manner that rotation of the control handle causes the acceleration rod to move up and down under the action of a rack and pinion. The brake, in turn, can be actuated by a lateral motion to the handle which is so mounted as to disengage the rack and pinion while the brake is being actuated.

The concepts of this invention may be practiced with various other ramifications. For example, a hand control may be provided for the actuation of the high beam. Additionally the front area of the vehicle may be modified to include a storage bench on the passenger's side so that the operator may enter the vehicle and slide on the bench to the driver's seat. The storage bench additionally provides greater open area by removal of the conventional passenger's seat so that the operator's wheelchair may be secured to the dashboard.

THE DRAWINGS

FIG. 1 is a side view in elevation of a stump operated control system in accordance with one embodiment of this invention;

FIG. 2 is a plan view of the embodiment shown in FIG. 1 and also illustrating the mounting of a wheelchair to the dashboard;

FIG. 3 is a front elevational view of the control systems shown in FIGS. 1-2;

FIG. 4 is a cross-sectional view taken through FIG. 2 along the line 4—4;

FIG. 5 is a cross-sectional view taken through FIG. 2 along the line 5—5;

FIG. 6 is a side view in elevation of a high beam actuating mechanism in accordance with this invention;

FIG. 7 is a side view in elevation of an alternative arrangement for connecting the control mechanism to the accelerator;

FIG. 8 is a side elevation view of a modified form of this invention designed for hand operation;

FIG. 9 is a plan view of the control system shown in FIG. 8; and

FIG. 10 is a front elevation view of the control systems shown in FIGS. 8-9.

DETAILED DESCRIPTION

FIGS. 1-5 show one embodiment of this invention which is designed to be stump operated. As indicated therein, the control system 10 is incorporated in a conventional vehicle V which includes a steering wheel 12 mounted at the end of a column 14. Additionally a gas pedal or accelerator 16 is mounted to the floor of vehicle V as well as a brake pedal 18. Gas pedal 16 and brake pedal 18 are actuated by up and down movement.

The present invention is designed to permit the necessary up and down movement to the gas pedal or accelerator 16 and brake 18 where the driver is without the use of his legs but does have use of the stump remaining above the knee. As best shown in FIGS. 1-3, a bracket 20 of any suitable type is mounted to the gas pedal 16. For example, the bracket may be channel-shaped and have an adjustable screw 22 or other clamping means for securing bracket 20 to pedal 16. A rod 24 is connected to bracket 20 by a suitable universal joint 26. Rod 24 is preferably adjustable in length to accommodate the needs of the particular driver. Such length adjustment can be achieved by forming rod 24 in two parts 28, 30, the ends of which are threadably received in internally threaded sleeve 32. Thus by manipulating sleeve 32 with respect to rod portions 28, 30, the appropriate length of rod 24 may be selected in accordance with the desired distance between pedal 16 and stump S. Obviously other means of adjusting the length of rod 24 may also be used within the concepts of this invention. A gas control element 36 is mounted at the end of rod 24 in any suitable manner such as by welding. Gas control 36 is preferably in the form of an L-shaped plate or bracket 34 on which the stump S would be placed. If desired, plate 34 may be padded for comfort. Stump S is held in place on control 36 in any suitable manner. For example, in the illustrated embodiment, a pair of velcro straps 38 are wrapped around stump S and bracket 34. Straps 38 may be completely detachable from bracket 34 or may be permanently mounted thereto, and similarly loops, slots or other guides may be provided for plate 34 to accommodate straps 38. As is apparent, by securing stump S to rod 24 in the above manner, actuation of the accelerator or gas pedal 16 is conveniently controlled by simple up and down movement of stump S. Although not illustrated, pedal 16 may be biassed upwardly in any suitable manner such as by a spring so that a downward force is required to accelerate while deceleration or the cessation of gas feeding is assisted under spring action. This is particularly desirable as later described when the stump is used for applying the brake and thus during brake application the accelerator pedal 16 will be in its up position.

FIG. 7 illustrates an alternative form of this invention wherein the gas pedal 16 is not used and instead rod 24A is mounted by a swivel or universal joint 26A directly to the accelerator rod 15A.

FIGS. 1–5 illustrate the mechanism for actuating the brake. As best shown in FIG. 5, brake pedal 18 has attached thereto a U-shaped bracket 40 which is secured in any suitable manner such as by strap 42. One Y-shaped arm 44 of a linkage 46 (FIG. 2) is mounted in bracket 40 with the strap or clamp 42 being disposed between the portions 48, 50 of arm 44 and more particularly over connecting portion 52 (FIG. 5) so that arm 44 is maintained in place in bracket 40. Arm 44 may likewise be made of a pair of portions 52, 54 which engage sleeve 56 for length adjustment similar to rod 24. Linkage 46 includes a second arm 58 mounted by a suitable swivel joint 60 to fulcrum plate 62 on the floor of vehicle V. Arm 58 likewise is made in a pair of segments 64, 66 connected by sleeve 68 for length adjustment. Individual segments 44 and 66 of linkage 46 are interconnected by rod 70 while segments 54, 64 and interconnected by rod 72. As is apparent, by fixedly mounting or pivoting arm 58 to plate 62, when a sidewards motion is imparted to linkage 46, a rotational affect will be achieved about pivot point 60. This, in turn, will result in an upward or downward movement of arm 44 depending on the direction of sidewards movement. In order to convert this sidewards movement into brake actuation, a brake control member such as arcuate plate 74 (FIG. 3) is secured to the outer end of segment 54. Brake control member 74 may be suitably padded for comfort. Brake control member 74 is suspended from wheel column 14 (FIG. 1) in any suitable manner such as by strap 76 mounted to the wheel column and spring 78 so selected in length and resiliency as to maintain brake control member 74 in the general area of gas control member 36 which is likewise in the general area of stump S. During operation, when it is necessary to apply the brake, the operator moves stump S laterally from right to left whereby stump S pushes against brake control member 74 causing linkage 46 to pivot clockwise around pivot point 60 resulting in a downward movement to brake 18. This same motion also results in a lifting of the acceleration pedal 16 so that gas is not being applied at the same time as the brake. An important feature of the invention is that both the brake control member 74 and gas control member 36 are located in the same general area of and underneath the steering wheel 12 and its column 14.

The provision of spring 78 is also desirable since it assures returning brake operating member 74 to its normal position when no pressure is being applied to the brake pedal. In accordance with a further feature of this invention, bracket 40 also includes a handle 80 to enable the driver to hand operate the brake should such be necessary.

FIGS. 8–10 illustrate a further embodiment of this invention which is designed for hand operation. As indicated therein, a gas pedal rod 124 is secured by joint 126 to gas pedal 116 by means of clamp 120 as previously described. Similarly linkage 146 is secured to brake pedal 118 and is pivoted about plate 162 by means of joint 160 so that sidewards movement from right to left will actuate the brake as also previously described. In this embodiment, however, the hand operation is achieved by mounting a plate or panel member 200 to steering column 114. Panel 200 includes a circular opening 202 through which the end of bracket 124 is inserted. Additionally panel 200 includes a slot 204 to accommodate the sliding movement of handle 206 as shown in FIGS. 8 and 10. Slots or holes 202 and 204 act as guides for the rod 124 and handle 206. Handle 206 is rigidly mounted to linkage 146 and includes a flexible shaft or cable 208 leading to pinion 210 which is engaged with rack 212 on rod 124. A rotational movement to handle 206 thereby causes pinion 210 to rotate which in turn moves rod 124 up or down to control gas pedal 116. Gas pedal 116 is preferably resiliently mounted in its up position and similarly pinion 210 is spring loaded and engaged with rack 212. Handle 206 operates similar to a motorcycle whereby, for example, clockwise rotation causes acceleration by moving rod 124 downwardly.

The actuation of brake 118 may similarly be accomplished by sliding handle 206 in slot 204 which causes linkage 146 to pivot about joint 160 in the manner previously described. Plate 200 also includes a slot 214 to accommodate the movement of shaft 208 that would result from the sliding of handle 206.

The sliding movement of handle 206 for actuating brake 118 also results in pulling pinion 210 away from and out of engagement with rack 212 so that the gas pedal is automatically inactivated when the brake is being applied.

FIG. 6 shows a further ramification of this invention wherein a hand control is provided for actuating high beam button 220. As indicated therein, a conventional emergency or park brake device 222 is provided at the left hand side of the driver. An actuator member 223 is mounted to brake 222 in any suitable manner such as by clamp 225 so that brake 222 may be conveniently hand operated. A set of brackets or guides 224 such as eyes are mounted on brake actuator member 223 for guiding rod 226 which is so located that by pushing the rod downwardly, the end of rod 226 will depress button 220. Rod 226 is resiliently mounted by spring 228 so that it is not in contact with the button or dimmer switch 220 when the brake is utilized.

FIGS. 1–2 also show a further aspect of this invention wherein the conventional passenger's front seat is removed and replaced by a bench 230. The bench permits the driver to enter the car from the passenger's side and slide to the driver's seat over bench 230. A wall such as wall 232 of bench 230 is preferably hinged so that the bench can also function as a storage compartment. By removing the conventional passenger's seat, extra space is provided so that, for example, the driver's wheelchair W may be stored against the dashboard D and held in place by any suitable fastening means such as elastic strap 236 which has one end hooked to a dashboard slot 234 and the other end coupled to the wheelchair. The driver's seat is also preferably a bucket seat to afford extra room for the wheelchair.

As is apparent, the invention thus lends itself in both embodiments to operation by a driver who is without the use of his legs and wherein the same limb whether it be a stump or hand can be utilized to control both the gas and the brake. The invention is particularly advantageous because it lends itself with minor modifications to incorporation in conventional motor vehicles. Additionally the manipulative actions which must be performed for operation of the invention are generally similar to the type of actions that a driver would ordinarily perform in operating a vehicle. The invention is significantly advantageous in that it may be performed by an operator with virtually no training.

What is claimed is:

1. A control system for the leg stump operation by a legless operator of a motor vehicle having a depressable accelerator and a depressable brake on the floor of the vehicle and having a steering wheel extending toward the driver's seat, comprising a rod secured to said accelerator and extending, toward said seat, leg stump-operated gas control means secured to said rod in the general area of said steering wheel for selectively moving said rod up and down in response to the movement of the stump to control the actuation of said accelerator, linkage secured to said brake and extending toward said seat generally alongside said rod, leg stump-operated brake control means secured to said linkage adjacent said stump-operated gas control means for actuating said brake in response to movement of the stump whereby the same stump of the operator may selectively actuate both said accelerator and said brake, and fastening means detachably mounting said leg stump to one of said control means.

2. The system of claim 1 wherein said gas control means comprises a plate for accommodating the stump, and said fastening means being disposed for mounting the stump to said plate.

3. The system of claim 2 wherein said brake control means comprises a further plate disposed for lateral movement upon contact by the stump.

4. The system of claim 3 including mounting means suspended from the steering wheel column and connected to said brake control plate for maintaining said brake control plate near said gas control plate.

5. The system of claim 4 including a handle vertically mounted to said brake to act as an auxiliary brake actuator.

6. The system of claim 1 wherein said rod and said linkage are adjustable in length.

7. The system of claim 1 wherein the vehicle includes a floor mounted dimmer switch and a park brake, an actuating member rigidly secured to said park brake and extending upwardly toward the steering wheel to facilitate hand operation of said park brake, an actuating rod being mounted against said dimmer switch and extending along said park brake actuating member toward said steering wheel for hand actuation by the operator of said dimmer switch, and guide means on said park brake actuating member for guiding said actuating rod in its up and down movement.

8. The system of claim 1 wherein a bench is disposed adjacent said driver's seat extending toward the passenger side door in place of a conventional seat whereby the driver may enter the vehicle from the passenger side and slide on said bench to said driver's seat.

9. The system of claim 8 wherein wheelchair mounting means is secured to the vehicle dashboard in front of said bench.

10. The system of claim 9 wherein one of the walls of said bench is openable whereby said bench functions as a storage compartment, and said wheelchair fastening means being detachably secured to a slot in said dashboard.

11. A control system for the legless operation of a motor vehicle having a depressable accelerator and a depressable brake on the floor of the vehicle and having a steering wheel extending toward the driver's seat, comprising a rod secured to said accelerator and extending toward said seat, operator actuated gas control means secured to said rod in the general area of said steering wheel for selectively moving said rod up and down to control the actuation of said accelerator, linkage secured to said brake and extending toward said seat generally alongside said rod, operator actuated brake control means secured to said linkage adjacent said operator actuated gas control means for actuating said brake whereby the same limb of the operator may selectively actuate both said accelerator and said brake, said linkage comprising a first arm slidably mounted to said brake, a second arm rigidly connected to said first arm and pivotally mounted to the vehicle floor and said arms being rigidly connected to said brake control means whereby the application of a sidewards force to said brake control means causes said linkage to pivot about the pivot point of said second arm to impart a vertical movement to said brake in response to the movement of said first arm.

12. The system of claim 11 wherein said gas control means comprises a plate for accommodating the stump of the operator, and detachable fastening means for mounting the stump to said plate.

13. The system of claim 12 wherein said brake control means comprises a further plate disposed for lateral movement upon contact by the stump.

14. The system of claim 13 including mounting means suspended from the steering wheel column and connected to said brake control plate for maintaining said brake control plate near said gas control plate.

15. The system of claim 14 including a handle vertically mounted to said brake to act as an auxiliary brake actuator.

16. The system of claim 11 wherein said rod and said linkage are adjustable in length.

17. The system of claim 11 wherein a plate is mounted to the steering wheel column, and said brake control means comprising a handle rigidly mounted to said linkage and slidably mounted to said plate.

18. The system of claim 17 wherein said rod includes a rack, a pinion engaged with said rack, and a shaft connecting said handle to said pinion whereby rotation of said handle causes said pinion to rotate to selectively raise and lower said rod.

19. The system of claim 10 wherein said rod extends through a hole in said plate.

20. The system of claim 18 wherein the lateral movement of said handle for actuation of said brake causes said pinion to be disengaged from said rack.

21. The system of claim 20 wherein said pinion is spring biassed for engagement with said rack, and said acceleration being biassed upwardly.

22. The system of claim 11 wherein the vehicle includes a floor mounted dimmer switch and a park brake, an actuating member rigidly secured to said park brake and extending upwardly toward the steering wheel to facilitate hand operation of said park brake, an actuating rod being mounted against said dimmer switch and extending along said park brake actuating member toward said steering wheel for hand actuation by the operator of said dimmer switch, and guide means on said park brake actuating member for guiding said actuating rod in its up and down movement.

23. The system of claim 11 wherein a bench is disposed adjacent said driver's seat extending toward the passenger side door in place of a conventional seat whereby the driver may enter the vehicle from the passenger side and slide on said bench to said driver's seat.

24. The system of claim 23 wherein wheelchair mounting means is secured to said vehicle dashboard in front of said bench.

25. The system of claim 24 wherein one of the walls of said bench is openable whereby said bench functions as a storage compartment, and said wheelchair fastening means being detachably secured to a slot in said dashboard.

* * * * *